(12) United States Patent  
Monette et al.

(10) Patent No.: US 7,792,996 B2  
(45) Date of Patent: Sep. 7, 2010

(54) METHOD AND NODES FOR HANDLING MULTICAST MESSAGES

(75) Inventors: Sylvain Monette, Blainville (CA); Mathieu Giguere, Vaudreuil-sur-le-Lac (CA); Martin Julien, Laval (CA); Benoit Tremblay, Laval (CA)

(73) Assignee: Telefonaktiebolaget L M Ericsson, Stockholm (SE)

( * ) Notice: Subject to any disclaimer, the term of this patent is extended or adjusted under 35 U.S.C. 154(b) by 1148 days.

(21) Appl. No.: 11/353,160

(22) Filed: Feb. 14, 2006

(65) Prior Publication Data

US 2006/0184695 A1 Aug. 17, 2006

Related U.S. Application Data

(60) Provisional application No. 60/651,971, filed on Feb. 14, 2005, provisional application No. 60/674,307, filed on Apr. 25, 2005.

(51) Int. Cl.
*G06F 15/16* (2006.01)

(52) U.S. Cl. .................. 709/246; 370/395.63; 370/473; 370/535; 370/390; 370/352; 370/401; 370/338; 370/328; 370/389

(58) Field of Classification Search .................. 709/246; 370/395.63, 473, 390, 535, 352, 401, 338, 370/328, 389
See application file for complete search history.

(56) References Cited

U.S. PATENT DOCUMENTS

| 6,807,175 B1 * | 10/2004 | Jennings et al. ............. 370/390 |
| 2002/0069278 A1 | 6/2002 | Forslow ....................... 709/225 |

(Continued)

FOREIGN PATENT DOCUMENTS

EP  1318628 A1 *  6/2003

(Continued)

OTHER PUBLICATIONS

Young-Joo Suh et al., An efficient multicast routing protocol in wireless mobile networks, Sep. 2001, Kluwer Academic, vol. 7, pp. 3-11.*

(Continued)

*Primary Examiner*—Wing F Chan
*Assistant Examiner*—Hitesh Patel

(57) ABSTRACT

The present invention relates to a method and nodes for handling multicast messages over an access domain. The method starts with the receipt of a multicast message from a service provider domain. The method pursues with the identification of a service agent corresponding to the service provider domain from which the multicast message is received. Then, the content of a Virtual Local Area Network (VLAN) Tag field of the multicast message is modified so as to correspond to the identified service agent. The modified multicast message is forwarded on the access domain. Upon receipt of the modified multicast message at an access node, the access node identifies at least one service binding related to the service agent identified in the VLAN Tag field of the received multicast message. For each related service binding, the access node adapts the VLAN Tag field of the multicast message so as to correspond to a local VLAN information, and forwards the adapted multicast message on a user port corresponding to the service binding. The invention also includes an access edge node and an access node adapted to perform the method of the present invention.

16 Claims, 8 Drawing Sheets

U.S. PATENT DOCUMENTS

2003/0165140 A1* 9/2003 Tang et al. .................. 370/393
2005/0190775 A1* 9/2005 Tonnby et al. .............. 370/401

FOREIGN PATENT DOCUMENTS

| WO | WO 02/14977 | 2/2002 |
| WO | WO 03/067823 | 8/2003 |
| WO | WO 03067823 A1 * | 8/2003 |

OTHER PUBLICATIONS

PCT Search Report dated Jun. 8, 2006 from corresponding application PCT/IB2006/050472.

* cited by examiner

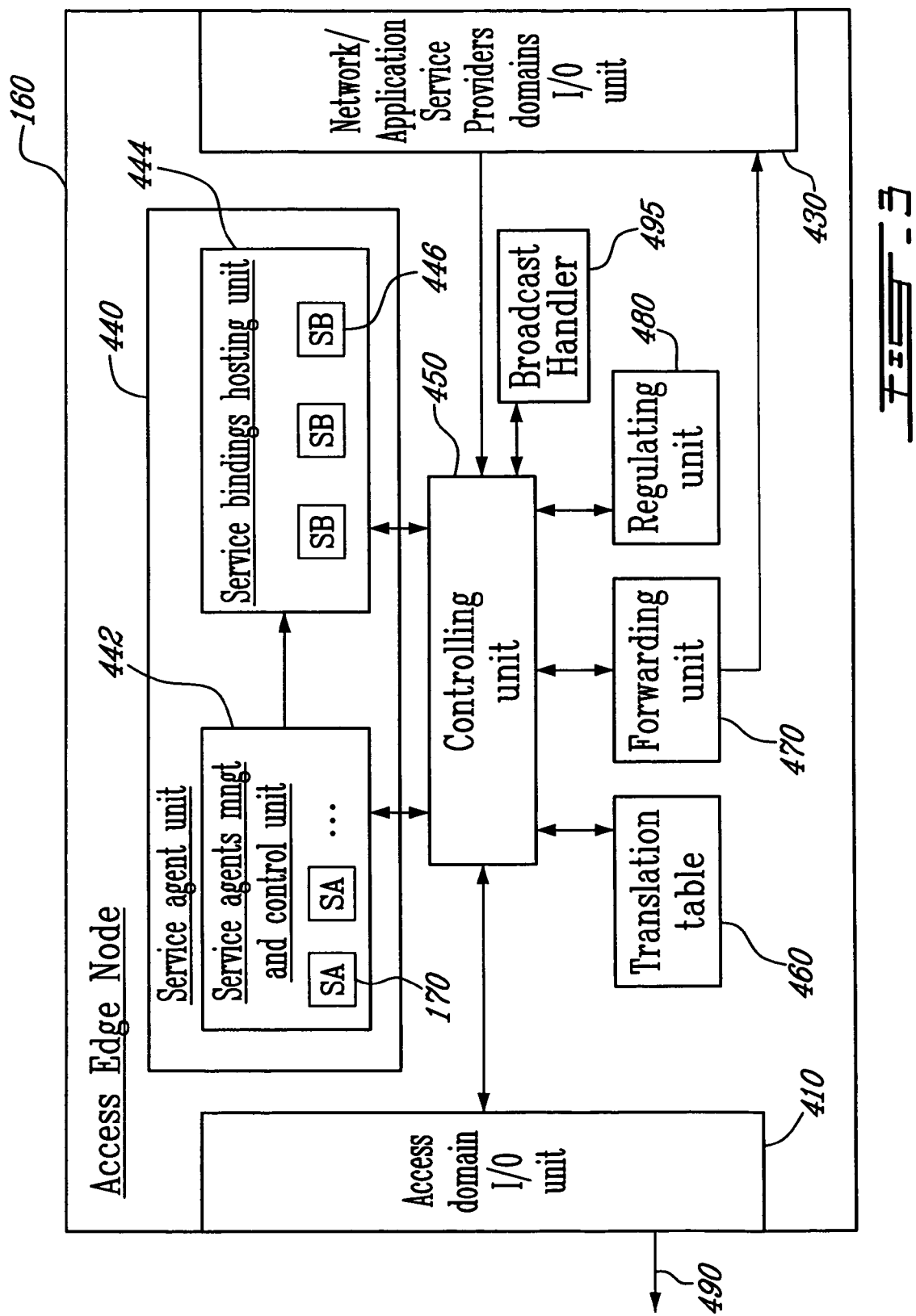

Service Agents mngt and Control unit 442

| Service Agent | Service Type | Properties | Service Provider D Port |
|---|---|---|---|
| SA | Service A | $Bw_1$, $Q_oS_2$, $IP_{v4}$ | Port XXY |
| $SA_1$ | Service B | $Q_oS_1$, $Bw_2$ | Port XYZ |
| $SA_2$ | Service A | $Bw_2$, $Q_oS_2$, $IP_{v6}$ | Port XXY |
| ... | ... | ... | ... |

Service Bindings Hosting Unit 444

| Service Type | User MAC info | User port on access node | Local network context | Access Node MAC |
|---|---|---|---|---|
| $SA_{1D}$ | | | | |
| $SA_1$ Service A | MAC add 1 | Port ABC | Local identifier X | $AN_1$ MAC |
| $SA_2$ Service C | MAC add 2 | Port AAB | Local identifier Y | $AN_1$ MAC |
| $SA_3$ Service B | MAC add 3 | Port ABA | Local identifier Z | $AN_2$ MAC |
| ... | ... | ... | ... | ... |

Transport Primitives 446

FIG. 4B

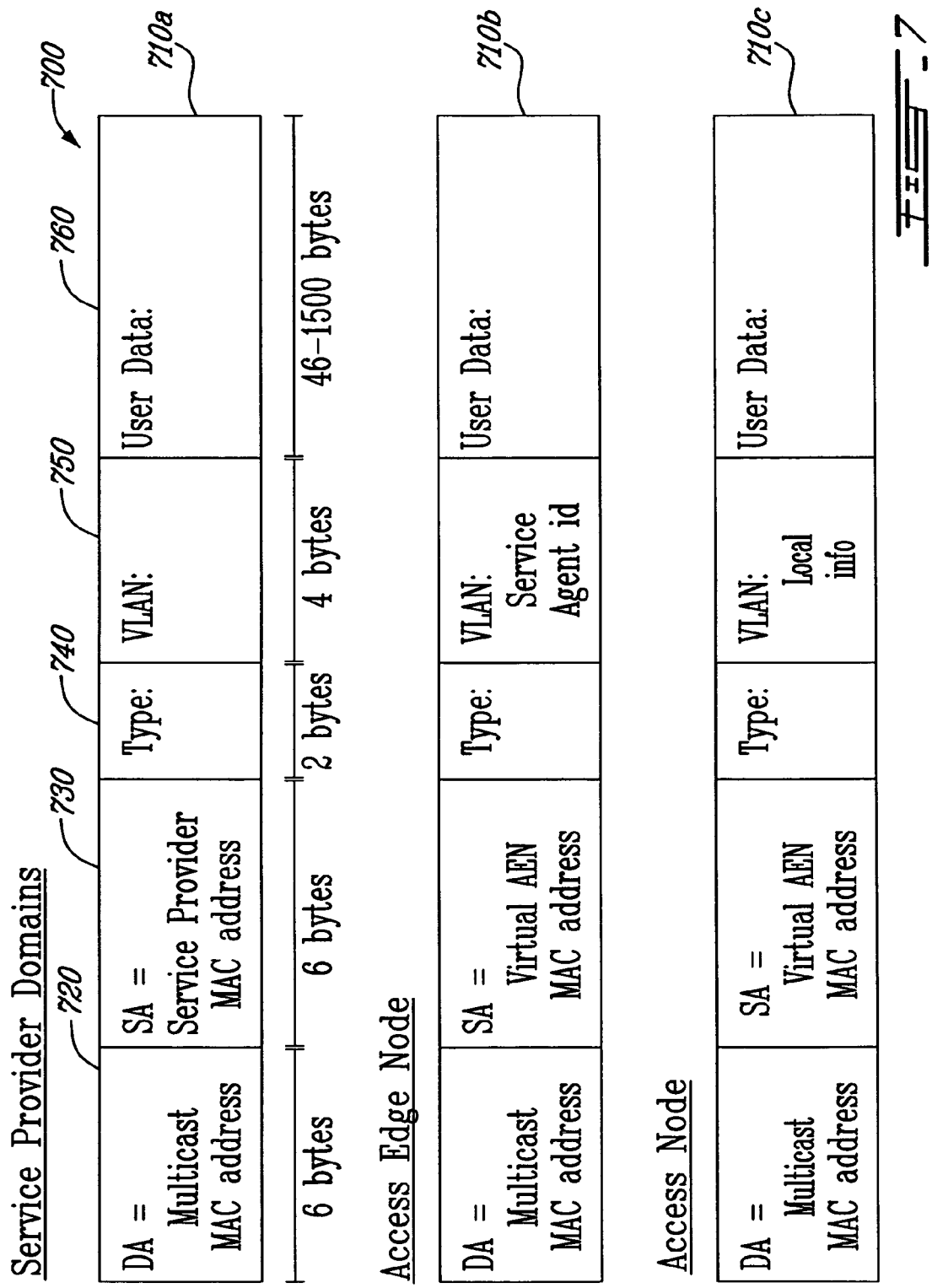

METHOD AND NODES FOR HANDLING MULTICAST MESSAGES

PRIORITY STATEMENT UNDER 35 U.S.C. S.119 (e) & 37 C.F.R. S.1.78

This non-provisional patent application claims priority based upon the prior U.S. provisional patent applications entitled "Poly project" and "Access node-edge node complex protocol (AEP)", having respective application No. 60/651, 971, filed Feb. 14, 2005, in the names of Sylvain Monette, Mathieu Giguere, Martin Julien and Benoit Tremblay, and application No. 60/674,307, filed Apr. 25, 2005 in the names of Sylvain Monette, Mathieu Giguere, Martin Julien and Benoit Tremblay.

BACKGROUND OF THE INVENTION

1. Field of the Invention

The present invention relates to a method and nodes for handling Multicast messages.

2. Description of the Related Art

Recent years have seen the explosion of Internet Protocol (IP) networks. Initially developed to allow universities and researchers to communicate and cooperate in research projects, it has grown into networks offered at a mass-market level. Nowadays, it is normal for households to have a connection to an IP network to surf the world-wide-web, play interactive games, carry Voice over IP, download documents and softwares, make electronic business transactions, etc.

Reference is now made to FIG. 1, which represents a prior art example of an IP network 100. Typically, an IP network is composed of an access domain 115, network service provider domains 140 and application service provider domains 150. The access domain 115 includes Access Nodes (AN) 120 and an access network 130, such as an IP network. The ANs 120 are network providers, which can offer access to the IP network 130 to user domains 110. The user domains 110 include for example User Devices (UDs) (such as computers, mobile phones, personal digital assistants, etc.), Local Area Networks (LANs) and Wireless-LANs (W-LANs). The user domains communicate with the ANs over various possible technologies. Amongst those technologies can be found dial-up connections and Asymmetric Distribution Subscriber Line connections over telephone lines, cable modems connecting over television cable networks, or wireless communications. The access network 130 is composed of a group of independent routers, which task is to route incoming data traffic based on a destination address embedded therein. As for the network service provider domains 140, they may correspond for example to Voice over IP services, while the application service provider domains 150 may correspond to electronic banking and electronic business transactions.

Though FIG. 1 depicts three user domains, two Access Nodes, two service provider domains and two application service domains, IP networks 100 typically include several thousands of user domains, tenths of Access Nodes, hundreds of service provider domains and application service provider domains. As to the access network 130, it is common to encounter networks including hundreds of routers. It is thus understood that FIG. 1 depicts a highly simplified IP network 100 for clarity purposes.

The initial principle at the basis of IP networks is to rely on switches and routers, which perform as few and as little operations as possible before routing incoming data traffic towards their final destination. For doing so, different kinds of messages are available: Unicast messages, Multicast messages and Broadcast messages. For each of those three types of messages, ranges of addresses are allocated for each type of messages. Unicast messages are used to exchange messages between one sender and one recipient. Multicast messages allow one sender to reach multiple recipients. As to broadcast messages, they are used to reach all switches part of a segment of the IP network.

More particularly, multicast messages are generated by Service Provider Domains. Since Service Provider Domains control their IP address space, they may use overlapping addresses in the multicast domain. Multicast messages from different Service Provider Domains using the same Multicast address will be merged into a single multi-service provider stream. This single multi-service provider stream will then be forwarded to all the access nodes on which a user domain has previously joined the multicast group, independent of the Service Provider Domain. Such a management of multicast may result in a flooding of the access nodes and user devices with unnecessary traffic.

There is currently no known solution to the problems associated with the explosion of the number of user devices and of service providers offering services on IP networks. Furthermore, no long-term solution has been identified to allow a tangible solution to the potential nuisance caused by Multicast messages over large IP networks servicing thousands of User Domains.

Accordingly, it should be readily appreciated that in order to overcome the deficiencies and shortcomings of the existing solutions, it would be advantageous to have a method and nodes for efficiently handling multicast messages, without unnecessarily overloading the network. The present invention provides such a method and nodes.

SUMMARY OF THE INVENTION

The present invention efficiently allows thousands of network service provider domains and application service provider domains to efficiently perform Multicasts by relying on the concept of service bindings. The method and nodes of the present invention handle multicast message in an efficient manner.

For doing so, the method of the present invention handles efficiently multicast messages over an access domain by Virtual Local Area Network (VLAN) tagging all multicast messages on a service provider domain basis. More precisely, the method of the present invention starts with receiving a multicast message from a service provider domain. Then, a service agent corresponding to the service provider domain from which the multicast message is received is identified. A Virtual Local Area Network (VLAN) Tag field of the received multicast message is modified, so as to correspond to the identified service agent. Afterwards, the modified multicast message is forwarded over the access domain.

Another aspect of the present invention relates to an access edge node, adapted to perform the method of the present invention. More precisely, the access edge node includes a service provider domain input unit, a controlling unit, and an access domain output unit. The service provider domain input receives messages from service provider domains. The controlling unit determines that one of the received messages is a multicast message, and then identifies a corresponding service agent therefor. The controlling unit also modifies a Virtual Local Area Network (VLAN) Tag field of the received multicast message so as to correspond to the identified service agent. The access domain output unit forwards the modified multicast message over the access domain.

In another aspect, the present invention is directed to an access node for receiving modified multicast messages from the access domain. The access node includes an access domain input unit, a service binding unit, a controlling unit and a user domain output unit. The access domain input receives the modified multicast messages from the access domain. The service binding unit stores service bindings related information. The service bindings relates information non-exclusively includes an identification of a corresponding service agent, a user MAC address, a user port identification and a local network context. The purpose of the service binding is to rule data traffic between a user domain and a service provider domain. For doing so, the service binding commits the access node and an access edge node in a manner of managing data traffic therebetween, over the access domain. It is the controlling unit that verifies whether the received message at the access domain input unit is a modified multicast message, and if so, identifies at least one service binding relating to the service agent identification included in the VLAN Tag field of the modified multicast message. For each identified service binding, the controlling unit adapts the content of the VLAN Tag field to correspond to the local network context of the service binding. The adapted multicast message is afterwards sent by the controlling unit to the user domain output unit, with an indication of the user port to be used for forwarding the adapted multicast message to a user domain.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 3 is a schematic representation of an access edge node in accordance with the teachings of the present invention;

FIG. 4a is an exemplary tabular representation of the content of a service agent's management and control unit in accordance with the present invention;

FIG. 4b is an exemplary tabular representation of the content of a service bindings hosting unit in accordance with the teachings of the present invention;

FIG. 7 is a diagram representing the modifications performed in the network to Multicast messages in the downstream of data traffic.

DETAILED DESCRIPTION OF THE PREFERRED EMBODIMENTS

Figure 1:
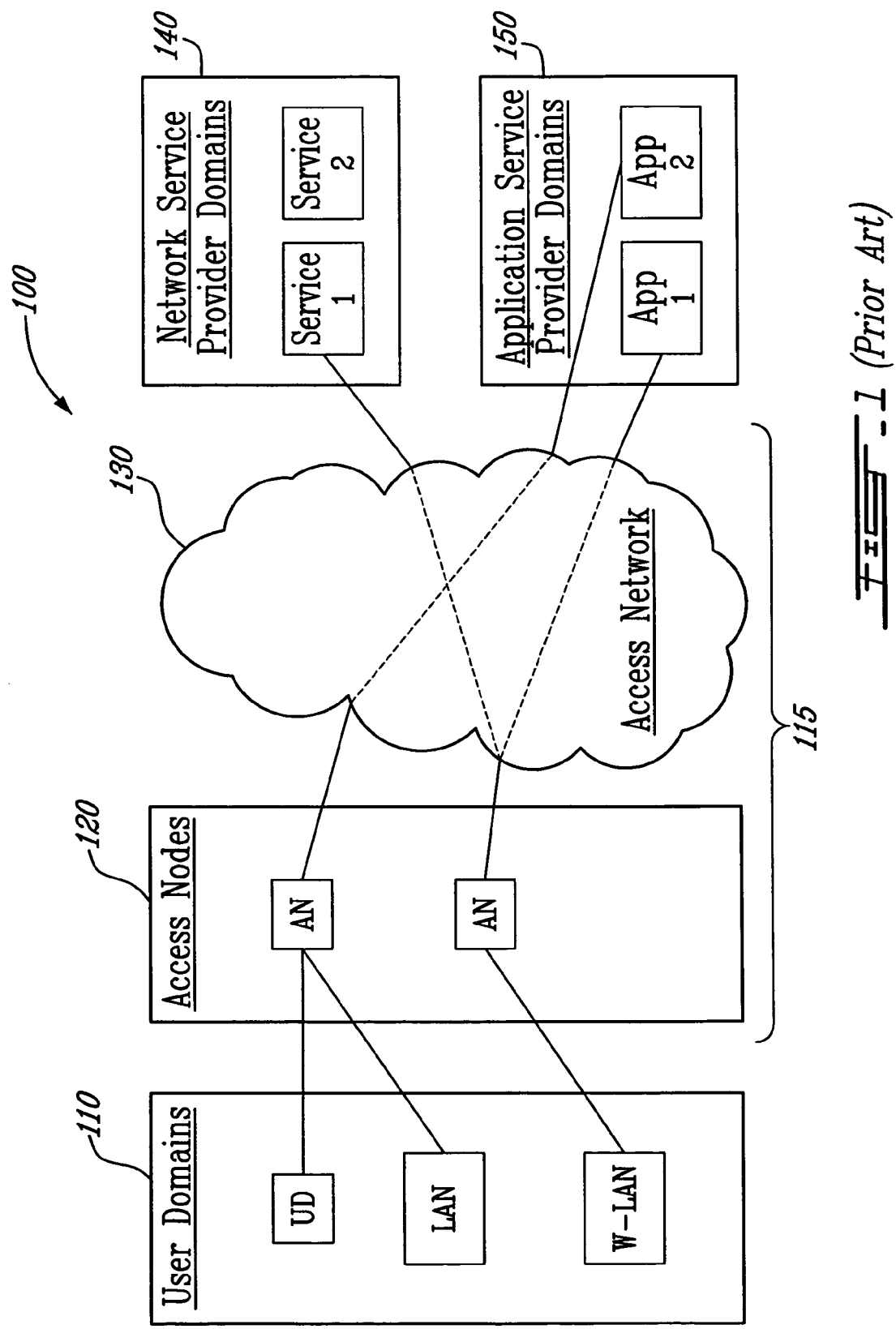
FIG. 1 is a prior art example of an IP network.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and nodes for efficiently managing multicast messages over an access domain. For doing so, an access edge node is introduced within the access domain, between the user domains and the service provider domains. The access edge node includes a service agent unit, which manages and controls service agents. Each of the service agents corresponds on one hand to one of the service provider domain, and on the other hand manages and controls therefor a Virtual Local Area Network (VLAN) over the access domain. The access edge node further includes a service bindings hosting unit which stores multiple service bindings. Each service binding identifies one of the service agents, user domain information and access domain transport primitives. The service bindings rule data traffic between one user domain and one of the service provider domains by committing the access node serving the user domain and the access edge node in a manner of managing data traffic therebetween over the access domain. Thus, to more efficiently communicate multicast messages, the present invention identifies at the access edge node the service agent corresponding to the service provider domain from which the multicast message was received. Then, the access edge node modifies the VLAN Tag field of the multicast message to correspond to an identifier of the corresponding service agent. The modified multicast message is forwarded on the access domain. Upon receipt at the access node, the modified multicast message is evaluated, and all service bindings related to the identified service agent are determined. For each service binding, the multicast message is adapted by changing the VLAN Tag field for a local context known from the user domain, and the adapted multicast message is forwarded to the user domain on the user port related to the service binding. The following paragraphs will provide a more detailed explanation of how service agents, service bindings, and the access edge node and access node are woven together so as to manage service bindings.

Figure 2:
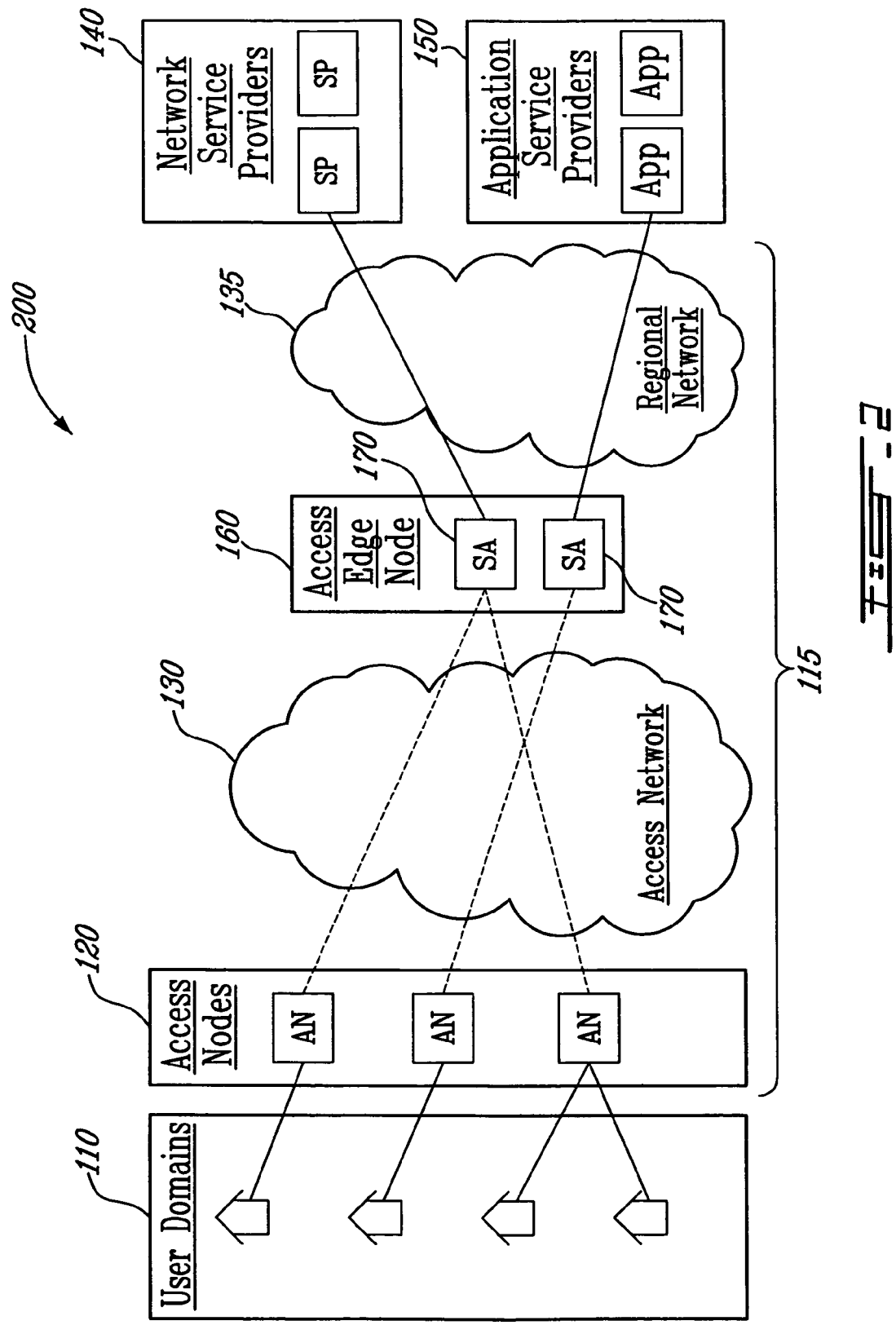
FIG. 2 is a schematic exemplifying a network in which the present invention has been incorporated.

To understand the present invention and its inventive mechanisms, reference is now made to FIG. 2, which is a schematic exemplifying a network 200 in which the present invention has been incorporated. The schematic representation of the network 200 has been simplified for clarity purposes, and the various elements depicted have been grouped by similar functions rather than graphically representing geographical network entities. However, each group of similar functions would typically correspond to a multitude of physical network entities performing those specific functions, geographically scattered throughout the network 200. The schematic representation of the network 200 includes user domains 110, an access domain 115 (including: access nodes 120, an access network 130, an access edge node 160 and a regional network 135), network service providers 140, and application servers 150. An exhaustive description and examples for each of those elements will be provided in the following paragraphs, with continued reference to FIG. 2.

The network 200 corresponds to one or multiple data networks communicating together. Thus, the network 200 could be operated by one or multiple operators. As data networks are usually supported by a number of different operational entities and/or organizations, it is necessary to define how those entities and organizations can successfully communicate. For this reason, data networks are usually explained and detailed using the Open System Interconnection (OSI) model. The OSI model defines a networking framework for implementing protocols in seven layers. Those seven layers are in the respective order: 1) Physical layer; 2) Data Link Layer; 3) Network Layer; 4) Transport Layer; 5) Session Layer; 6) Presentation Layer and 7) Application Layer. Each layer corresponds to an aspect to be considered and actions to be undertaken when performing data transmission over a data network. Using the OSI model to describe the network 200 of the present invention, it is possible to layer some of the various protocols used and/or supported by the network of the present invention as follows:

Layer 2: Ethernet, Asynchronous Transfer Mode;
Layer 3: Internet Protocol (IP) versions 4 and 6,
Layers 4 and 5: Transmission Control Protocol (TCP) and User Datagram Protocol (UDP); and
Layers 6 and 7: various presentations and applications protocols currently existing and to come.

It should be understood that the above list of protocols is provided for exemplary purposes, rather than for limiting the protocols supported by the present invention.

Turning now to the access domain 115, it is possible to summarize its function as a means to provide end-to-end access between the user domains 110 and the network service providers 140 and application service providers 150. The access domain includes the access nodes 120, the access network 130, the regional network 135 and the access edge node 160. Thus, the access domain 115 is not an entity per se; it is rather an aggregation of components, which when interconnected together either directly or indirectly, act as a domain for providing access, hence its name "access domain". It should thus be clear that the current representation of the access domain 115 including only one access node 120, one access network 130, one access edge node 160 and one regional network 135 does not mean that such entities are found single in the access domain, but rather that for sake of clarity only one such entity is represented. The following paragraphs explain in greater details the various components of the access domain.

The access nodes 120, which also include access gateways (not shown), represent the first component of the access domain 115. The access nodes 120 typically refer to access providers, which allow user domains 110 accesses to the access network 130, upon, for example, subscription or pay-per-usage basis. Such access can be made possible using various mediums and technologies. Amongst the possible mediums are cable, landline phone, and wireless phone. As to the possible technologies, Integrated Services Digital Network (ISDN) and Asymmetric Digital Subscriber Line (ADSL), Worldwide Interoperability for Microwave Access (WiMax) are examples of possible technologies. However, it should be noted that the present invention is not limited to those mediums or technologies. Also, even though only three access nodes have been depicted, it should be noted that the network 200 potentially includes hundreds or thousands of access nodes.

The access domain also includes the access network 130 and the regional network 135 which will be discussed together. The primary function of the access network 130 and the regional network 135 is to provide end-to-end, and independent transport between the access nodes 120 and the network service providers 140 and the application service providers 150. The access network 130 and regional network 135 are networks capable of tasks such as: aggregation, switching and routing downstream and upstream data traffic. The access network 130 is preferably capable of using Ethernet, or other similar protocols, which correspond to the Layer 2 of the OSI model, but is not limited thereto. It could advantageously be capable of supporting IPv4 and/or IPv6. The regional network 135 preferably supports Ethernet and/or IP and MPLS, and possibly other Layer 3 capable protocols. Furthermore, it should be noted that the access network 130 and the regional network 135 could be operated and/or managed by a single operator or by many different operators.

It is through a tight coupling of their traffic-engineering capabilities through the access edge node 160, that the access network 130 and the regional network 135 can provide end-to-end Quality of Service (QoS). The access edge node's role 160 is the creation, management and hosting of service agents 170 and service bindings (not shown in FIG. 2, but depicted on FIG. 3). Each of the service agents 170 corresponds to one of the service provider domains (140 or 150), and manages and controls therefor a VLAN over the access network 130. The expression "service binding" refers to a binding between the user domain 110 and one of the network service provider domain 140 or one of the application service provider domain 150. The access edge node and the concepts of service agents and service bindings will be described in further detail in the description referring to FIGS. 3, 4a and 4b.

Turning now to the user domains 110, the latter rely on the access domain 115 for handling end-to-end communication with the network service providers 140 and the application service providers 150. It should be noted that in the present description, use of the word "domain" refers to one or multiple network elements sharing similar functional features. Thus, in the context of the present invention, the expression "user domains" may refer to independent computers, local networks of computers connected through a router either physically or wirelessly, wireless phones, Personal Digital Assistants (PDAs), and all other devices that are capable of data communication over a data network such as network 200. Additionally, the expression "user domain" is intended to also include multiple simultaneous data traffic sessions performed with a multitude of devices, through one single user port. For example, a user could concurrently access different applications and network services such as Internet access, video conferencing, and television programs with one or multiple devices through a user domain located VLAN, or one single user port referred to herein as "user domain".

The network service providers 140 refer to entities that use the access domain 115 to provide IP addressing and connectivity to another IP network, and to offer and deliver specific application. In the context of data traffic with the user domains 110, the network service providers 140 typically own and assign IP addresses to the user domains 110, using identification based on for example Remote Authentication Dial-In User Service (RADIUS). The network service providers 140 may further perform user-level authentication and authorization if desired and/or necessary.

The application service providers 150 use the access domain 115 to offer and deliver application(s) to end-users of the user domains 110. Examples of such applications include gaming, video on demand, videoconferencing, and many other possible applications. It is however the access domain 115 that assigns IP addresses on behalf of the applications service providers to the user domains 110. If desired, the application service providers 150 can also perform authentication at the user-level and authorization if necessary. It should be noted that in the foregoing description, the expression "service providers" and "service providers domains" will be alternatively used to represent concurrently both network service providers 140 and application service providers 150, and the expression "service provider" represents one of the network service providers 140 or application service providers 150.

As previously mentioned, a service binding relates to a transport relationship. That transport relationship is established between one of the user domains and one of the service providers, and directly impacts the serving access node 120 and one of the serving agents 170 of the access edge node 160. Conceptually speaking, the creation of a service binding corresponds to adding the identified user domain to the VLAN corresponding to the service provider domain over the access domain. Thus, each service binding represents a tradable business entity, which guarantees delivery of the corresponding service, with the right integrity and QoS, between a specific user port of the user domain and a specific provider port of the service provider. Service bindings are created, managed and hosted in the access edge node, and exist in combination with the service agents 170.

Since the service agents and service bindings are created, managed and hosted in the access edge node, reference is now made concurrently to FIGS. 2 and 3, where FIG. 3 is a schematic representation of an access edge node in accordance with the teachings of the present invention. To be able to perform the tasks of creation, management and hosting of the service agents and service bindings, the access edge node is composed of multiple elements. Because of its location in the access domain 115, the access edge node includes an input/output unit including an access domain input/output unit 410 for communicating with the access network 130 of the access domain 115 and with access nodes 120. The input/output unit of the access edge node 160 also includes a network/application service provider domains input/output unit 430 for communicating with the network service providers 140 and application service providers 150 over the regional network 135. Furthermore, the access edge node 160 includes a service agent unit 440, a controlling unit 450, and may optionally further include a translation table 460, a forwarding unit 470, a regulating unit 480 and a broadcast handler 495.

The service agent unit 440 is composed of a service agents management and control unit 442 and a service bindings hosting unit 444. The service agent unit 440 keeps existing service agents' 170 information in the service agents' management and control unit 442. The service agents' management and control unit 442 in turn is responsible for the creation and management of the service bindings 446. For doing so, the service agents management and control unit 442 determines when new service bindings 446 are required or can be removed, and proceeds with the creation/removal of service bindings 446. The service agents' management and control unit 442 is also responsible for the adding/removal of user devices to existing service bindings. Furthermore, the service agents management and control unit 442 is responsible for ensuring synchronicity of service bindings 446 related information with access nodes with which it is interacting. The service agents' management and control unit 442 is also responsible for the creation of Multi Protocol Label Switching (MPLS) reserved paths in the access network 130, when such a reserved path is required.

Reference to FIG. 4a, which represents an exemplary tabular representation of the content of the service agents' management and control unit 442, is now concurrently made with FIG. 3. Each of the rows of FIG. 4a, at the exception of the first row, which is a header row, represents exemplary content of some of the service agents 170 managed and controlled by the service agents management and control unit 442. Each of the columns of FIG. 4a corresponds to specific information, maintained by the service agents' management and control unit 442, for each of the service agents 170. The first column represents an identification of the service agent 170. That identification is typically a number or a service agent identifier corresponding to the service agent. In accordance to a preferred embodiment of the invention, each service agent in the access edge node has a unique service agent identifier, and corresponds to one specific service provider domain 140 or 150. The second column refers to an identification of a specific service type for the corresponding service agent. For example, in cases where one service provider domain 140 or 150 offers multiple services, each of the services offered is associated with a different service type so as to differentiate between the various services of a service provider domain. The third column identifies the preferred or necessary Quality of Service (QoS) required for properly transporting data traffic for that service provider domain and the related service type. Exemplary criteria for QoS may include delay, bit error rate, bandwidth, and preferred protocol. The fourth column indicates a port to be used in the regional network to communicate with the corresponding service provider domain. In addition to this content, the service agents' management and control unit 442 includes sufficient logical software and hardware to create additional service agents and remove unnecessary service agents. It should be noted as well that even though the content of the service agents' management and control unit has been represented in FIG. 4a in the form of a table, such content is not limited thereto. The service agents' management and control unit could be composed of a relational database, hard coded components, microprocessors, programming library, etc. . . .

Reference is now made to FIG. 4b, which represents an exemplary tabular representation of the content of the service bindings hosting unit 444, concurrently with FIG. 3. Each of the rows of FIG. 4b, at the exception of the header row, represents exemplary content of some of the service bindings 446 hosted in the service bindings hosting unit 444. Each of the columns of FIG. 4b corresponds to specific information, hosted in the service bindings hosting unit 444, for each of the service bindings 446. The first column represents an identification of a corresponding service agent, by using for example the service agent identifier of the service agent. The second column identifies the service type, as described in relation with FIG. 4a. The other columns represent the transport primitives for data traffic related to the service binding. More specifically, the third column identifies a user domain Media Access Control (MAC) address. The fourth column consists of an identification of a port used by the user domain on the serving access node. The fifth column corresponds to the local network arbitrary identifier used by the user domain, and may include for example implicit or explicit VLAN information. The sixth column refers to a virtual MAC address of the access node serving the user domain. Hence, each service binding 446 binds together one of the service agents, one of the user domains and one of the access nodes for providing data traffic between one user domain and one service provider domain 140 or 150. It should be noted that even though the content of the service bindings hosting unit 444 has been represented in FIG. 4b in the form of a table, such content is not limited thereto. The service bindings hosting unit could be composed of a relational database, hard coded components, microprocessors, programming library, etc. . . .

Furthermore, the service bindings hosting unit may further contain a seventh column which includes an IP address uniquely identifying the user domain or a user device thereof. That unique IP address could be provided to the user domain or user device by the access edge node through a protocol such as Dynamic Host Configuration Protocol (DHCP), using for example Broadcast mechanism that could be performed prior to the service request message. The combination of the service agent identifier and the user domain or user device unique IP address thus represents a simple and reliable way of quickly relating incoming messages to the proper service binding. Typically, once the service binding has been created and the access node has been informed thereof, data traffic therebetween can be aggregated over the access domain in accordance with the service binding, and the aggregated data traffic received at the access edge node can be disaggregated prior to its forwarding to the corresponding service provider domain using the information provided in the service bindings hosting unit. More particularly, in the case where the access domain is an Ethernet network, the service agent identifier is provided, for example, in the field known as the VLAN Tag of Unicast, Multicast and Broadcast messages, while the user domain or user device IP address is provided in IP messages embedded in the Ethernet messages. Based on the service agent identifier provided in the VLAN Tag field of the Ethernet message, and on the IP address provided in the embedded IP message, the service agent unit 440 can disaggregate the data traffic and ensures its forwarding to the corresponding service provider domain, and inclusion of necessary information on the sending user domain, such as user MAC info and its local network context.

Returning now to the description of FIG. 3, the controlling unit 450 of the access edge node is responsible for determining, upon receipt of a service request related message 420, whether it corresponds to one of the service agents. For doing so, the controlling unit 450 consults the service agents' management and control unit 442 to determine whether one of the service agents 170 corresponds to the service provider domain identified in the service request related message 420. In the event that one of the service agents 170 corresponds thereto, the controlling unit 450 instructs the service agents' management and control unit 442 to create a service binding 446 for the received service request related message. The creation of a service binding 446 for the received service request related message 420 includes adding an entry in the service bindings hosting unit 444, in which:

the service agent ID (first column) corresponds to the service agent identifier for the service agent corresponding to the requested service provider domain;
  the user MAC info is the user device MAC address;
  the user port on access node is an identification of the port on the serving access node with which the user device is connected;
  the local network context corresponds to an arbitrary identifier provided in a field labelled "VLAN tag" of Ethernet messages to be received from the user device and corresponding a local user domain identifier; and
  the access node MAC is a virtual MAC address for the access node serving the user device for which the service request related message was received.

Then, the controlling unit 450 informs the access node serving the user domain identified in the service request related message, through a service binding related message 490 sent by the access domain input/output unit 410, of the creation of the service binding 446. In the event that a service binding already exists for the service request related message 420, the controlling unit 450 informs the serving access node of the existing service binding through the service binding related message 490.

The controlling unit 450 also interacts with the translation table 460. Since each service agent 170 of the service agents' management and control unit is uniquely identified by a service agent identifier, it is necessary to keep in the translation table a mapping between the service agent identifier corresponding to service agents 170 and corresponding service provider domains (140 or 150). Thus, upon receipt of data traffic at the access domain input/output unit 410 having a destination address corresponding to a virtual MAC address for the access edge node 160 and a VLAN tag corresponding to one of the service agent identifier, the controlling unit 450 consults the translation table 460 to obtain a fast translation of the access edge node virtual MAC address to the destination service provider domain (140 or 150) address corresponding to the service agent identifier provided in the VLAN tag.

The controlling unit 450 further consults with the forwarding unit 470, to determine whether received data traffic at the access domain input/output unit 410 is to be directly forwarded to the service provider domains input/output unit without any modification.

Finally, the controlling unit 450 can also interact with a regulating unit 480, which can perform, on received data traffic at either the access domain input/output unit 410 and the network/application service providers domain input/output unit 430, downstream/upstream traffic policing and marking, traffic remarking, as indicated and/or required by corresponding service agents 170.

Figure 5:
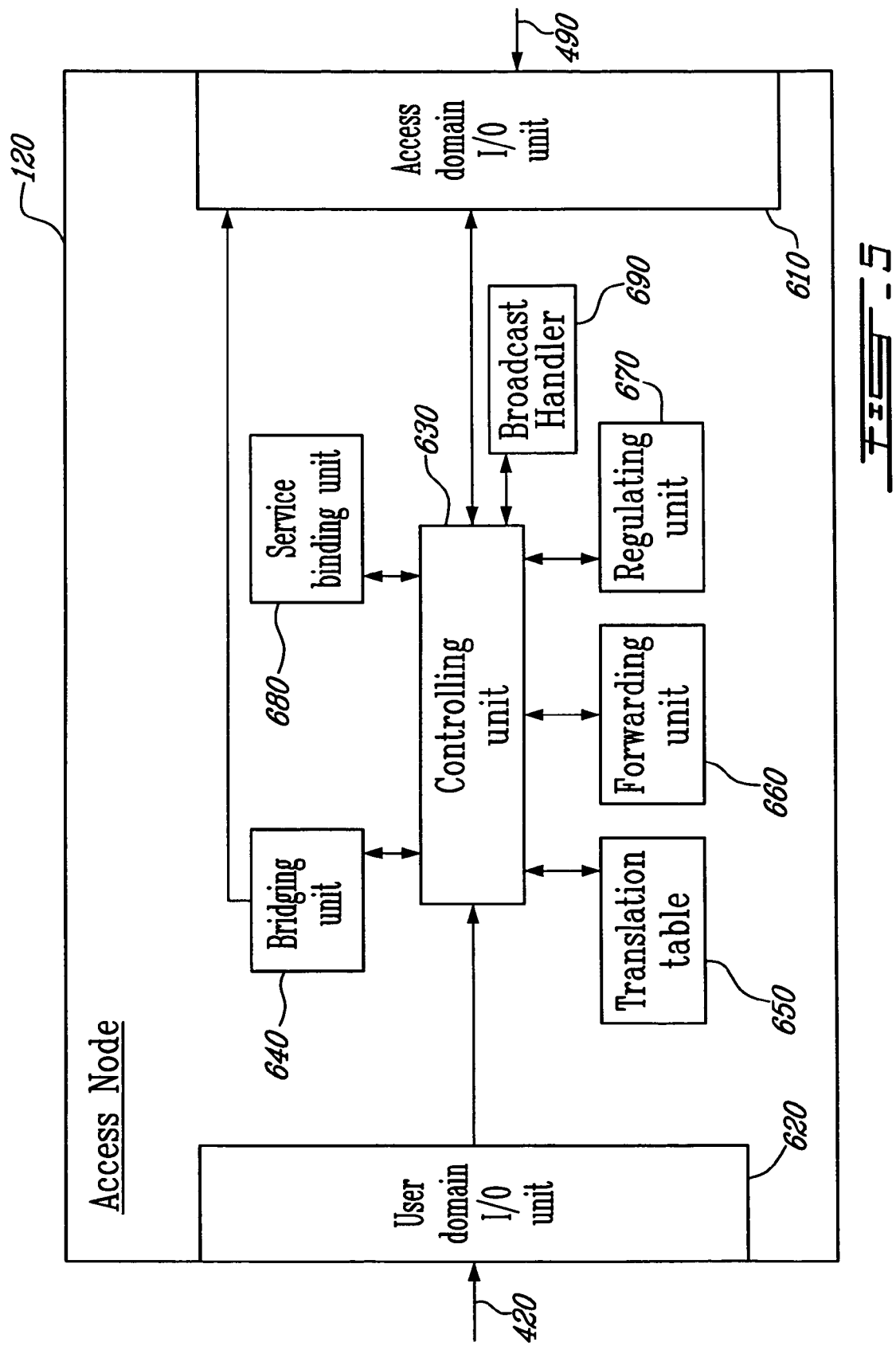
FIG. 5 is a schematic representation of an access node in accordance with the teachings of the present invention.

Reference is now made to FIG. 5, which is a schematic representation of one of the access nodes in accordance with the teachings of the present invention. Because of its location in the access domain 115, the access node 120 includes an access domain input/output unit 610 for communicating with the access network 130 of the access domain 115 and with the access edge node 160. The access node 120 also includes a user domains input/output unit 620 for communicating with the user domains 110. A type of message received at the access domain input/output unit 610 is the service binding related messages 490. The service binding related messages 490 are generated by the access edge node 160, and sent over the access network 130.

One of the various responsibilities of the service binding unit 680 is the hosting of service bindings related information. Service bindings related information contains specific service binding information (in the form of service agent identity and service type), identification on a port of the access node to communicate with the user domain, and local network context of the user domain.

The access node 120 further handles incoming data traffic originating from/destined to user domains to which it provides access service to the access network 130. For doing so, the access node 120 further contains a translation table 650, a forwarding unit 660, a regulating unit 670, an aggregation unit 680 and a broadcast handler 690. For doing so, data traffic received at the access node 120 by either the user domain input/output unit 620 or the access domain input/output unit 610 is forwarded to the controlling unit 630. The controlling unit 630 interacts with the translation table 650. Since each service binding stored in the service bindings hosting unit 444 of the service agent unit 440 is identified by a combination of parameters (service agent identity, service type, user device MAC address and access node virtual MAC address), it is necessary to keep in the translation table 650 a mapping between the service agent identity corresponding to service agents 170 and corresponding service provider domains (140 or 150). Thus, upon receipt of data traffic at the access domain input/output unit 610 having a destination address corresponding to the virtual MAC address of the access node 120, the controlling unit 630 consults the translation table 650 to obtain a fast translation of the destination address and VLAN tag so as to correspond respectively to the user domain MAC address and the local identifier. Such translation is required, because the user domain information is not carried over the access domain between the access edge node 160 and the access node 120.

The controlling unit 630 further consults with the forwarding unit 660, to determine whether received data traffic at the access domain input/output unit 610 or at the user domain input/output unit 620 is to be directly forwarded to the corresponding user domain 110 or the access network 130 without any modification.

Finally, the controlling unit 630 can also interact with a regulating unit 670. Interaction with the regulating unit 670 is required, for example, when downstream/upstream traffic policing and marking, traffic remarking, is necessary, as indicated in the properties of the service binding.

Now that the access node 120 and the access edge node 160 have been described in detail, the foregoing describes more thoroughly how the data traffic is aggregated over the access domain. In typical Ethernet networks, three types of messages are used for exchanging data traffic between two entities: Unicast messages, Multicast messages and Broadcast messages. The Unicast messages are used to exchange data traffic between one sender and one recipient. The Multicast messages are used for efficiently sending data traffic from one sender to multiple recipients. As to the Broadcast messages, they are used to send messages from one sender to all switches on a segment of the network. The present invention focuses on using service bindings in conjunction with Multicast message over the access domain.

Figure 6:
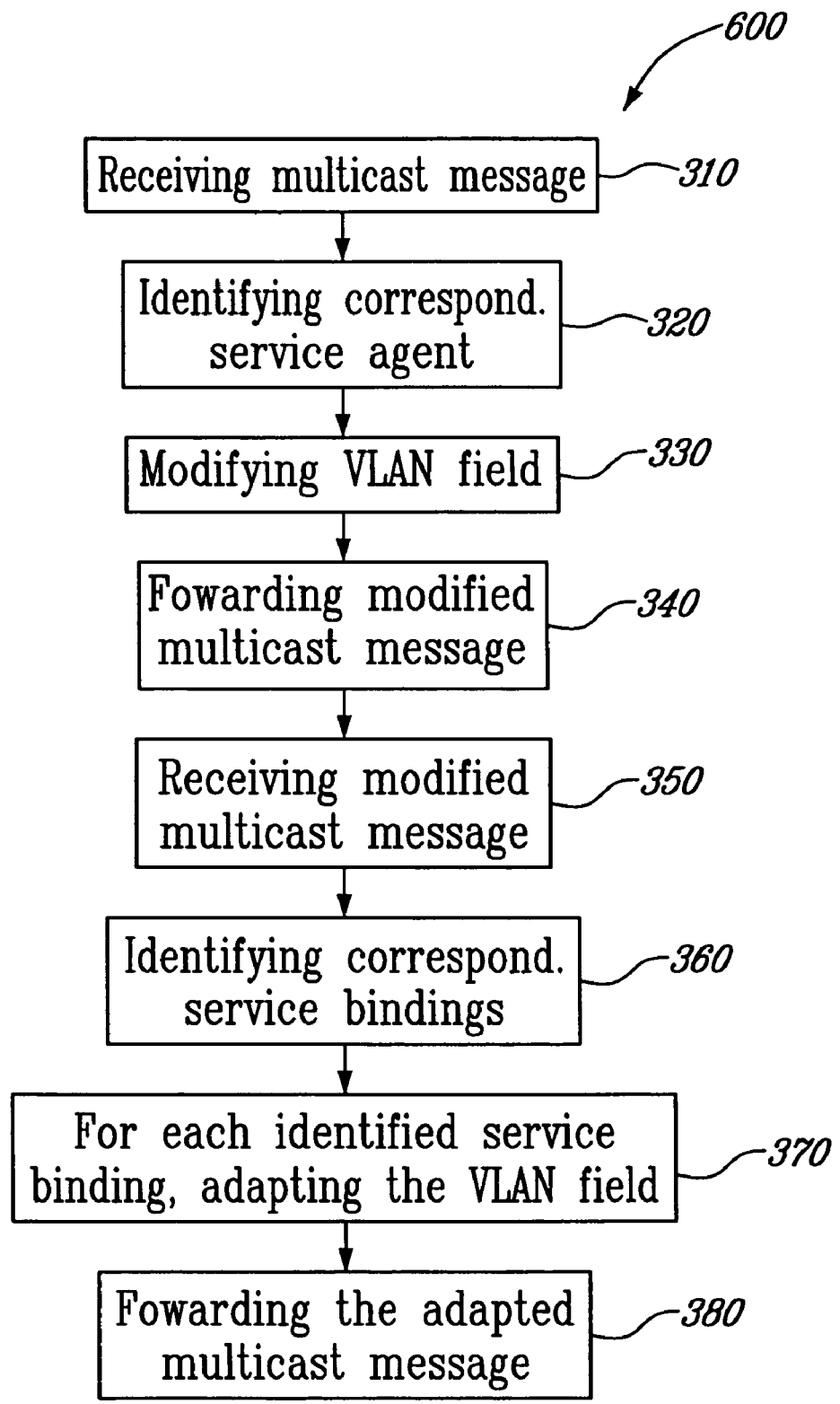
FIG. 6 is a simplified flowchart of a method for handling multicast messages in accordance with the present invention.

Reference is now made to FIG. 6 that represents a simplified flowchart of a method for handling multicast messages in accordance with the present invention. The method starts with a step 310 of receiving a multicast message. The multicast message is received at the access edge node 160. Then, the method pursues in step 320, wherein the access edge node 160 identifies a service agent 170 corresponding to the received multicast message. To identify the corresponding service agent 170, the controlling unit 450 uses, for example, the input port identity in the network/application service providers domains input/output unit 430 and the information provided in the VLAN Tag field. When the corresponding service agent 170 has been identified, the method continues in step 330 with modifying the VLAN Tag field of the received multicast message so as to correspond to an identity of the identified service agent. Then, the modified multicast message is forwarded on the access network 130 in step 340. The modified multicast message is carried through the access network 130 by a multiple switches forming the access network 130. Because of the modified VLAN Tag field, all Layer 2 switches in the access network listen on Internet Group Management Protocol (IGMP) messages, using an IGMP snooping feature, on a per VLAN basis. The modified VLAN Tag field thus allows the Layer 2 switches of the access network to only send multicast traffic on the correct VLAN, thereby reducing data traffic. The modified multicast message is received in one or multiple access nodes in step 350. The method continues in step 360, where each receiving access node identifies from its current service bindings which ones correspond to the modified multicast message. As the modified multicast message contains an identification of the corresponding service agent, and the service binding unit 680 of the access node maintains information on which user domain and service agent there are some service bindings, it is possible to identify the user domains to which the received modified multicast message should be forwarded. But since the received multicast message has been modified to include the service agent identifier, the method then includes a step 370 of adapting, for each identified service binding, the modified VLAN Tag field. The adapting step may consist for example of replacing the service agent identifier in the VLAN Tag field with local user context information contained in the service binding unit 680. Afterwards, the method concludes with step 380 which consists in forwarding the adapted multicast message to the user domains at the user port mentioned in the identified service binding.

Reference is now made to FIG. 7. FIG. 7 depicts modifications performed in the network to a multicast message in the downstream data traffic, in accordance with the present invention. In the present application, upstream data traffic refers to data traffic sent from the user domain 110 to one of the service provider domain 140 or 150, while downstream data traffic refers to data traffic sent from the service provider domain 140 or 150 to one or multiple user domains 110. FIG. 7 depicts, for exemplary purposes only, Ethernet Multicast messages for exemplary purposes, such as described in International Electrical and Electronic Engineering (IEEE) 802.3ac. But it should be understood that any other type of protocol that uses fields of similar functions could also be used in the context of the present invention. Multicast messages typically include the following fields: a Destination Address (DA) 720, a Source Address (SA) 730, a Type 740, a VLAN Tag 750 and User Data 760. The Destination Address 720 refers to a multicast address, and consists of 6 bytes. The Source Address 730 indicates from which address the Multicast message originates, and contains 6 bytes. The Type field 740 is 2 bytes long. The VLAN Tag 750 is 4 bytes long, and usually refers to a VLAN identifier only known and meaningful to the destination address and the source address. Finally, the user data 760 varies between 46-1500 bytes, and contains the data traffic being sent from the source address 730 to the destination address 720.

FIG. 7 more specifically depicts a Multicast message, originating from one of the service provider domains 140 or 150 is represented through its various modifications through the network in accordance with the present invention. The service provider domains 140 or 150 generates a multicast message 710a, in which: the Destination Address 720 corresponds to a multicast MAC address, the Source Address 730 is the service provider domains 140 or 150 MAC address, and the VLAN Tag 750 corresponds to a local service identifier of the service provider domains 140 or 150. The Multicast message 710a generated by the service provider domain 140 or 150 is sent and received by the access edge node 160, where some modifications are performed by the controlling unit 450 prior to forwarding the multicast message over the access network 130. More particularly, the source address 730 is replaced by a virtual MAC address for the access edge node, and the VLAN Tag is changed to correspond to the service agent identification. By modifying the VLAN Tag field, the access edge node improves the performance of the access network 130 by reducing the data traffic on the switches located therein by allowing the switches (not shown) to do IGMP snooping on a per VLAN basis. The modified multicast message 710b is sent from the access edge node over the access network 130 to the related access nodes. The access nodes receive the modified multicast message 710b, and change again the VLAN Tag field 750 so as to correspond to a local user context information. For doing so, the access nodes rely on the service binding information stored in the service binding unit 680. The multicast message 710c is sent from the access nodes 160 to the user domain on the user port identified in the service binding.

As can be appreciated, the modifications to the multicast message are visible only to the access node 120, access network 130 and the access edge node 160. The modifications to the multicast message are transparent to the user device 110 and the service provider domain 140 or 150. The modifications are possible because of the service bindings created by the access edge node 160, and enforced at both the access node 120 and the access edge node 160. The service bindings stored at both the access node and the access edge node store the information required to perform the modifications to the multicast messages. The results of the modifications include the streaming of multicast messages over the access network 130, and a reduction of data traffic received at the access nodes and user domains, without impacting the user domains 110 and the service provider domains 140 and 150.

Although several preferred embodiments of the method and nodes of the present invention have been illustrated in the accompanying Drawings and described in the foregoing Detailed Description, it will be understood that the invention is not limited to the embodiments and protocols disclosed, but is capable of numerous rearrangements, modifications and substitutions without departing from the spirit of the invention as set forth and defined by the following claims.

What is claimed is:

1. A method for handling multicast messages in an access domain, the method comprising steps of:
   receiving at an access edge node a multicast message from a service provider domain;
   identifying at the access edge node a service agent corresponding to the service provider domain;
   modifying at the access edge node a Virtual Local Area Network (VLAN) Tag field of the received multicast message so as to correspond to the identified service agent;
   forwarding from the access node to an access node of the access domain, the access node serving a user domain, the modified multicast message over the access domain;
   receiving the modified multicast message at the access node;
   identifying at the access node at least one service binding corresponding to the service agent indicated in the VLAN Tag field;
   for each service binding identified, adapting at the access node the VLAN Tag field so as to correspond to a local VLAN information; and
forwarding from the access node the adapted multicast message on a user port corresponding to the service binding;
   wherein the service binding is created at the access edge node, the service binding ruling data traffic between the user domain and the service provider domain by committing the access node and the access edge node in a manner of managing data traffic therebetween over the access domain, the service binding being related to one of the service agents of the access edge node, and service binding information being stored at the access edge node and at the access node.

2. The method of claim 1, wherein: the receiving step, the identifying step and the modifying steps are performed in an access edge node of the access domain, the access edge node being an entry point for the service provider domain into the access domain; and the identifying step is performed using a destination address and source address of the multicast message.

3. The method in accordance with claim 2, wherein the destination address is a multicast MAC address and the source address is a service provider domain MAC address.

4. The method in accordance with claim 1, wherein the service agent corresponds to a specific service provider domain, and manages therefor a Virtual Local Area Network (VLAN) over the access domain.

5. The method in accordance with claim 4, wherein the VLAN Tag field is modified so as to correspond to a service agent identifier, representative of the service agent.

6. The method in accordance with claim 1, wherein the service binding information stored at the access edge node includes: service agent identification, a user domain MAC address, a local network context of the user domain, and a serving access node MAC address.

7. The method in accordance with claim 6, wherein the service binding information stored at the access edge node further includes:
   service type identification and a user port on the service access node information.

8. The method in accordance with claim 1, wherein the service binding information stored at the access node includes: service agent identification, user domain MAC address, user port on the access node information and local network context of the user domain.

9. An access edge node for handling multicast messages, the access edge node comprising:
   a service provider domain input/output unit for communicating with a service provider domain over a network and for receiving messages therefrom;
   an access domain output unit for communicating with an access node over an access domain; and
   a controlling unit comprising one or more processors for controlling the service provider domain input/output unit and the access domain output unit, for determining that a received message at the service provider domain input/output unit is a multicast message, for identifying a corresponding service agent, for modifying a Virtual Local Area Network (VLAN) Tag field of the received multicast message so as to correspond to the identified service agent, and for requesting the access domain output unit to forward the modified multicast message over the access domain.

10. The access edge node in accordance with claim 9, wherein: the controlling unit identifies the corresponding service agent using a destination address and source address of the multicast message.

11. The access edge node in accordance with claim 10, wherein: the destination address is a multicast MAC address and the source address is a service provider domain MAC address.

12. The access edge node in accordance with claim 9, wherein: the service agent corresponds to a specific service provider domain, and manages therefor a Virtual Local Area Network (VLAN) over the access domain.

13. The access edge node in accordance with claim 9, wherein: the VLAN Tag field is modified so as to correspond to a service agent identifier, representative of the service agent.

14. An access node for handling multicast messages received from an access domain, the access node comprising:
   an access domain input unit for receiving multicast messages from an access edge node over the access domain;
   a user domain output unit for sending messages toward user domains;
   a service binding unit for storing service bindings related information, each service binding ruling data traffic between a user domain and a service provider domain by committing the access node and the access edge node in a manner of managing data traffic therebetween over the access domain, the service binding related information including for each service binding an identification of a corresponding service agent, a user MAC address, user port identification and a local network context; and
   a controlling unit comprising one or more processors for controlling the access domain input unit, the user domain output unit and the service binding unit, for verifying whether the received message at the access domain input unit is a multicast message, for identifying at least one service binding relating to a service agent identification of a Virtual Local Area Network (VLAN) Tag field of the received multicast message, for each identified service binding, for adapting the content of the VLAN Tag field to the local network context, and for requesting the user domain output unit to forward the multicast message adapted by the controlling unit, on the user port identified in the related service binding.

15. The access node in accordance with claim 14, wherein the service bindings are created at an access edge node, and the access node is informed of the created service bindings through the access domain input unit.

16. The access node in accordance with claim 14, wherein a destination address of the multicast message forwarded at the user domain output unit is a multicast MAC address of a service provider domain and the source address is a service provider domain MAC address.

* * * * *

UNITED STATES PATENT AND TRADEMARK OFFICE
CERTIFICATE OF CORRECTION

PATENT NO. : 7,792,996 B2  
APPLICATION NO. : 11/353160  
DATED : September 7, 2010  
INVENTOR(S) : Monette et al.

Page 1 of 1

It is certified that error appears in the above-identified patent and that said Letters Patent is hereby corrected as shown below:

On Page 2, item (56), under "FOREIGN PATENT DOCUMENTS", in Column 2, Line 1, delete "WO WO 03/067823  8/2003".

In Fig. 6, Sheet 7 of 8, for Tag "340", in Line 1, delete "Fowarding" and insert -- Forwarding --, therefor.

In Fig. 6, Sheet 7 of 8, for Tag "380", in Line 1, delete "Fowarding" and insert -- Forwarding --, therefor.

In Column 1, Line 4, delete "U.S.C. S.1 19" and insert -- U.S.C. §119 --, therefor.

In Column 1, Line 5, delete "C.F.R. S.1.78" and insert -- C.F.R. § 1.78 --, therefor.

In Column 8, Line 27, delete "etc...." and insert -- etc. --, therefor.

In Column 8, Line 58, delete "etc...." and insert -- etc. --, therefor.

Signed and Sealed this  
Twenty-second Day of February, 2011

David J. Kappos  
*Director of the United States Patent and Trademark Office*